Feb. 27, 1968 B. GOOTT ETAL 3,370,305

HEART VALVE WITH MAGNETIC HINGE MEANS

Filed May 28, 1965

INVENTORS
BERNARD GOOTT
ROBERT T. BRUSS

Braddock + Burd

ATTORNEYS 3,370,305
Patented Feb. 27, 1968

3,370,305

HEART VALVE WITH MAGNETIC HINGE MEANS

Bernard Goott, Minneapolis, Minn. (1457 Lowry Medical Art Bldg., St. Paul, Minn. 55402), and Robert T. Bruss, P.O. Box 5646, Minneapolis, Minn. 55417

Filed May 28, 1965, Ser. No. 459,634
8 Claims. (Cl. 3—1)

This invention relates to a check valve having a magnetically hinged disc valving element. More particularly, this invention relates to a prosthetic heart valve for installation in a human or other animal heart as replacement for disease damaged or other malfunctioning valves.

Impaired heart function directly attributable to malfunctioning of one or more of the heart valves is a fairly common ailment. Although the concept of replacing original natural valves with artificial valves was regarded as revolutionary until relatively recently, such rapid strides have been made in the field of cardiac surgery and organ replacement that the operation can now almost be regarded as commonplace. A number of artificial valves are available, principally of the ball and cage and overlapping hinged leaf types. A number of deficiencies are recognized in the existing artificial valve. These include damage to the blood cells, bulk of the valve, audible operation, undesirable pressure differentials, leakage, and the like.

It is the principal object of the present invention to provide an artificial heart valve which is durable and dependable, has a magnetically hinged disc valving element which lifts easily with little force when the heart pumps to pass the blood and then closes positively to prevent backflow.

It is a further object of the present invention to provide a prosthetic heart valve having a magnetically hinged valving element capable of withstanding back pressure to prevent blood from trickling back after passage through the valve.

It is a still further object of the present invention to provide a prosthetic heart valve having a magnetically hinged disc valving element which is adapted to replacing any of the heart valves.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

Figure 1:
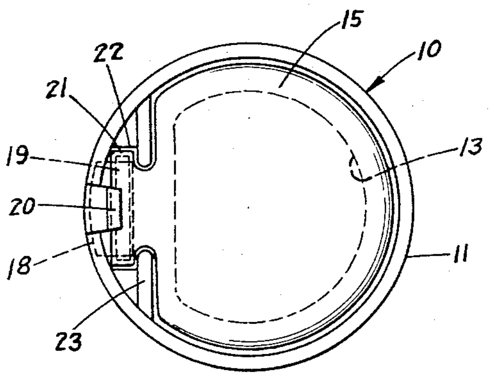
FIGURE 1 is a top plan view of one form of a heart valve according to the present invention shown on an enlarged scale.
Figure 2:
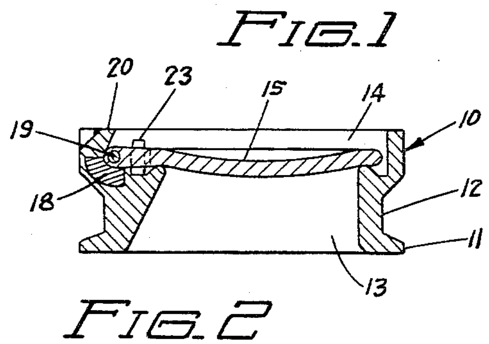
FIGURE 2 is a transverse vertical section through the valve of FIGURE 1 showing the valve in closed position.
Figure 3:
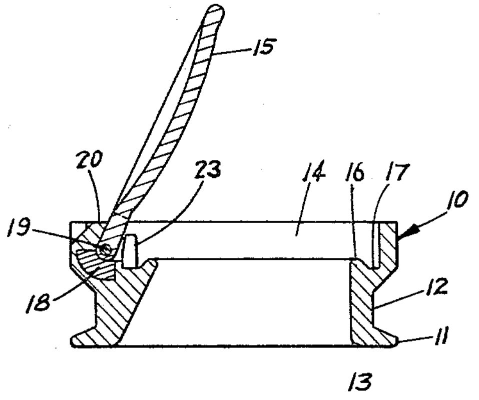
FIGURE 3 is a similar transverse vertical section showing the valve of FIGURE 1 in open position.

Referring now to the drawings, and particularly to FIGURES 1 through 3, there is shown one form of valve according to the present invention indicated generally at 10. The valve 10 comprises a rigid valve body 11 of generally annular form having an external channel or groove 12 adapted to receive a sewing or suture ring (not shown) of suitable material to receive a needle or thread or suture for sewing the valve to an annular wall of living tissue which has been prepared to receive it. The valve body 11 is provided with a central channel or port 13 for relatively free unobstructed flow of blood when the valve is open. The upper end 14 of channel 13 is of slightly enlarged diameter and forms a relatively shallow transverse chamber for receiving a disc valving element 15. An annular ridge 16 spaced from the valve body wall by annular groove 17 functions as a seat for the valving member 15.

A magnet 18 is set into the valve body adjacent one side of the relatively shallow valving element chamber 14. Magnet 18 functions as a hinge or pivot bearing for the disc valving element 15. Magnet 18 is in the form of a short length of bar magnet which is provided with an exposed channel or groove which is generally arcuate in cross section and is adapted to serve as a rolling hinge journal or rolling pivot seat for the disc valving element 15. As shown, the disc valving element 15 is provided with a rod or pin 19 which seats and rotates in the arcuate groove or channel in the exposed face of magnet 18. The pin or rod 19 is magnetically attracted to the magnet 18 so as to retain the valving member 15 in continuous edge contact while at the same time permitting it to pivot or hinge freely in order to open to the position of FIGURE 3 from the closed position of FIGURE 2 in response to the pressure of blood flow.

A limit stop 20 is provided on one side of the valve body 11 immediately adjacent to the magnetic pivot bearing 18 in order to limit the upward path of movement of the disc valving element 15. As seen in FIGURE 3, the valving element 15 is opened to its farthest extent. The valving element should be permitted to swing through an arc of up to about 70° to 85°. When the valving element is in its open position it is maintained in edge contact with the valve body 11 through the magnetic attraction between the magnetic bearing member 18 and the hinge pin 19 of the valving member.

Where it is desirable to prevent rotation of the valving disc 15 with respect to the axis of the body, the valving disc is provided with a T-shaped key member 21 on one side adapted to engage a slightly larger and similarly shaped key slot 22 in the top of the valve body. The end of the T-shaped key 21 is maintained in the end of the T-shaped key slot 22 in the top of the valve body 11 by magnetic attraction. The throat of the key slot 22 is desirably defined by a pair of opposed rib or ridge elements 23 which assist in retaining the disc valving element against separation from the valve body in the open position as well as against rotation within the valve body in the closed position.

Figure 4:
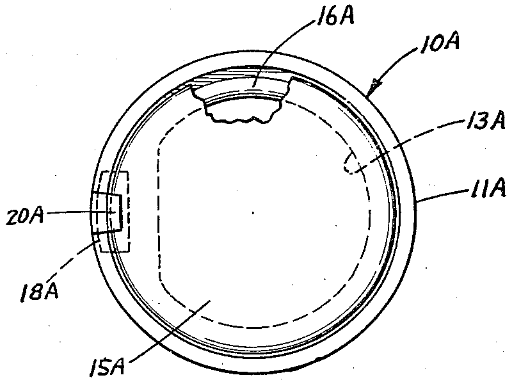
FIGURE 4 is a top plan view of another form of heart valve having a magnetically hinged disc valving element, shown partly broken away to expose the valve seat.
Figure 5:
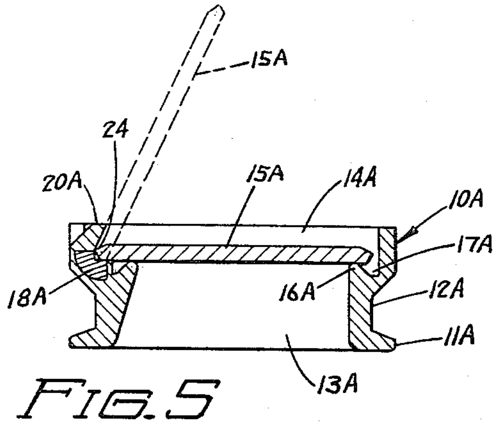
FIGURE 5 is a transverse vertical section through the valve structure of FIGURE 4 showing the valve in closed position in full lines and showing the valve in open position in broken lines.

In FIGURES 4 and 5 there is shown a modified form of magnetically hinged heart valve. This modified structure, indicated generally at 10A, includes a generally annular rigid valve body 11A having an annular groove or channel 12A for receiving a suture ring for attachment of the valve to living tissue. A central blood flow channel 13A extends through the body and is widened at one end to provide a transverse relatively shallow chamber 14A for receiving a disc valving element 15A. The disc valving member 15A seats upon an annular ridge 16A spaced from the valve body by an annular groove 17A. The disc valving element 15A pivots in a magnetic hinge member 18A set into one side of the valve body. Opening of the disc valve is limited by a limit stop 20A formed in the valve body immediately adjacent to the hinge member.

In the form illustrated, the disc valving member 15A is in the form of a circular disc having a knife edge pivot surface extending around the circumference of the disc. The faces of the pivot surface 24 are preferably disposed at about right angles to one another and the longitudinal channel or groove on the inner face of the magnetic hinge 18A is preferably provided with complementary surfaces at right angles to one another such that when the valve is in open position the faces of the pivot edge at point of contact are in face-to-face magnetic contact with the corresponding surfaces of the magnetic hinge 18A. While the disc valving member 15A is free to rotate within the valve body, one sector of its periphery functioning as a hinge is constantly in contact with the magnetic hinge element 18A.

Figure 6:
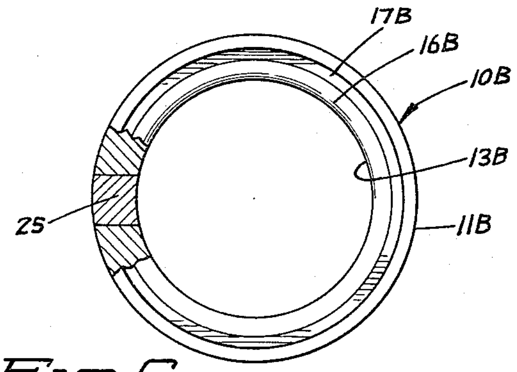
FIGURE 6 is a top plan view of another form of heart valve shown with the valving disc element removed and partly broken away to reveal the body structure.

In FIGURE 6 there is shown another form of heart valve indicated generally at 10B. This valve includes an annular valve body 11B, of cross section generally similar to those forms of valve body already described, having an annular groove 12B for receiving a suture ring and a blood flow central channel 13B surrounded by annular ridge 16B functioning as a valve seat and separated from the valve body by an annular groove 17B. According to this modified form of heart valve, the annular rigid valve body 11B is formed of a permanent magnetic material, except for a non-magnetic spacer 25 having the same cross section as the magnetic portion of the valve body and separating the opposite poles of the magnetic body. The spacer 25 may be formed wholly from non-magnetic material such as epoxy resin or non-magnetic metals or the like.

Because of inherent size limitations on heart valves, this form of heart valve permits creation of a stronger magnetic field without increasing the size of the valve. A disc valving element similar to those already described is seated against the annular ridge valve seat 16B and this valving element is hinged magnetically in the area of the spacing member 25 between the opposed poles of the magnetic portion of the body. Although in the form illustrated in FIGURE 6, the disc valving member of necessity must be circular and rotatable, the form of valve body of FIGURE 1, utilizing a disc valving member keyed against rotation, may obviously be formed to utilize the same general configuration in which the valve body itself is largely magnetic.

In some instances in the form of heart valve shown in FIGURES 4 and 6 it may be desirable for the disc valving element to be polygonal in shape rather than circular. In these instances the disc receiving chambers should have the same geometry whether octagonal, decagonal or the like. This polygonal form of disc performs the double function of insuring against rotation on the disc and insuring a flat hinging surface for maximum magnetic contact.

The magnetic hinge bearings 18 and 18A and the magnetic valve body 11B may be formed from any of a variety of well known and available permanent magnetic materials. Typical materials include the line of permanent magnetic alloys sold under the name "Alnico" composed of iron containing varying amounts of nickel and aluminum, along with cobalt and/or copper, and sometimes minor amounts of other materials; "Cunife" permanent magnetic alloy composed of copper, nickel and iron; "Cunico" permanent magnetic alloy composed of copper, nickel and cobalt; platinum-cobalt magnetic alloy; chrome magnetic alloy; cobalt magnetic alloy; tungsten magnetic alloy; and the like.

In addition, ferro-magnetic ceramics may be used. These are commonly designated "ferrites" and are composed of ferric oxides and varying amount of one or more bivalent metallic oxides, hydrooxides or carbonates such as those formed with zinc, manganese, nickel, cobalt, magnesium and copper. Such permanent magnetic ferrites can most readily be shaped before firing.

All of the exposed parts of the heart valve must be inert, non-toxic, non-irritating, capable of sterilization and not subject to corrosion or other attack by body fluids, or coated with materials imparting these properties. Typically the rigid valve body 11 or 11A is composed of a non-magnetic material such as acrylic resin (Lucite), nylon, rigid polyvinyl chloride, rigid organosilicon oxide polymers, stainless steel, and the like. The disc valving elements are desirably formed from a somewhat resilient plastic or resinous material, such as the silicon rubber material known as "Silastic," polyvinyl chloride, nylon, or the like, molded around a magnetic or magnetizable material attracted to the magnetic hinge bearing. For example, the hinge pin or rod 19 of disc valving member 15 may be an iron pin embedded within silastic or it may be a small bar magnetic disposed so that its poles are attracted by the opposite poles of the magnetic hinge bearing 18.

Where the disc valving member is circular a magnetizable metal ring may be embedded within the periphery of the disc, or the disc may be provided with a rim of magnetizable metal. Alternatively, the entire disc valving member may be composed of a material attracted to the field of the magnetic hinge element, such as magnetic stainless steel. In each instance the magnetic attraction between the hinge component of the valve body and the disc valving element need only be sufficient to retain the disc valving member in engagement while permitting it to pivot open and closed in response to blood flow and back pressure. The disc valving elements may be formed flat, or they may be slightly dished to provide a shallow concavity as shown in FIGURES 2 and 3.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A prosthetic heart valve for replacement of malfunctioning natural heart valves comprising (A) a generally annular rigid valve body, (B) an annular external channel to receive a suture ring for attachment of said valve to living tissue, (C) a central blood flow channel through said body, (D) one end of said channel being of enlarged diameter, (E) valve seat means at said enlarged end of said channel, (F) a disc valving element seating in closed position on said valve seat means, said disc valving element being magnetically attractive over at least a portion of its periphery, (G) magnetic hinge means adjacent said enlarged end of said blood flow channel magnetically engaging one edge of said disc valving element in pivotal relationship, and (H) limit stop means adjacent said hinge means to restrict the movement of said disc valving element.

2. A heart valve according to claim 1 further characterized in that said magnetic hinge means comprises a permanent bar magnet set into the periphery of said enlarged end of said blood flow channel.

3. A heart valve according to claim 2 further characterized in that said bar magnet set into the periphery of said enlarged end of said blood flow channel includes an inwardly facing longitudinal groove receiving a sector of the peripheral edge of said disc valving element in magnetically attractive pivotal hinge engagement.

4. A heart valve according to claim 1 further characterized in that said limit stop comprises an inwardly extending projection overhanging the enlarged end of said blood flow channel over said magnetic hinge means, the inner face of said projection extending at an angle of about 70° to 85° from the transverse plane of said valve extending approximately across said valve seat means.

5. A heart valve according to claim 1 further characterized in that said disc valving element is keyed against rotation about the longitudinal axis of said annular valve body.

6. A heart valve according to claim 1 further characterized in that said valve seat means comprises a generally annular ridge, the top edge of said ridge lying in a transverse plane perpendicular to the axis of said annular valve body and separated from the valve body by a shallow annular groove.

7. A heart valve according to claim 1 further characterized in that said generally annular valve body is composed of permanently magnetic material in the form of an open ring, the spaced apart ends of which are connected together by means of non-magnetic material rigidly and tightly secured to those ends, said magnetic hinge means comprising the magnetic field between said ends.

8. A check valve comprising (A) a generally annular rigid valve body, (B) a central fluid flow channel through said body, (C) one end of said channel being of enlarged diameter, (D) valve seat means at said enlarged end of said channel, (E) a disc valving element seating in closed position on said valve seat means, said disc valving element being magnetically attractive over at least a portion of its periphery, (F) magnetic hinge means adjacent said enlarged end of said flow channel magnetically engaging one edge of said disc valving element in pivotal relationship, and (G) limit stop means adjacent said hinge means to restrict the movement of said disc valving element.

References Cited

UNITED STATES PATENTS

| | | | |
|---|---|---|---|
| 623,478 | 4/1899 | Keene | 137—527 |
| 991,784 | 5/1911 | Kiley | 137—527.4 |
| 2,646,071 | 7/1953 | Wagner | 251—65 XR |
| 2,949,931 | 8/1960 | Ruppright | 251—65 XR |
| 3,265,062 | 8/1966 | Hesse | 128—145.8 |
| 3,294,115 | 12/1966 | Koenigsberg et al. | 251—65 XR |

OTHER REFERENCES

"Artificial Mitral Valves" by J. H. Stuckey, IRE Transactions on Medical Electronics, March 1959, vol. ME6, No. 1, page 42. (Copy in Group 335, 3–1HV.)

"Mitral Valve Prosthesis," The Bulletin of the Dow Corning Center for Aid to Medical Research, vol. 5, No. 4, October 1963, page 16. (Copy in Group 335, 128, Silicone Digest.)

RICHARD A. GAUDET, *Primary Examiner.*

R. L. FRINKS, *Assistant Examiner.*